US012638871B2

(12) United States Patent
Kim et al.

(10) Patent No.: US 12,638,871 B2
(45) Date of Patent: May 26, 2026

(54) LDO REGULATOR FOR DYNAMIC VOLTAGE SCALING AND SYSTEM-ON-CHIP INCLUDING THE SAME

(71) Applicant: Samsung Electronics Co., Ltd., Suwon-si (KR)

(72) Inventors: Seki Kim, Suwon-si (KR); Susie Kim, Suwon-si (KR); Dongha Lee, Suwon-si (KR); Takahiro Nomiyama, Suwon-si (KR)

(73) Assignee: Samsung Electronics Co., Ltd., Gydonggi-do (KR)

( * ) Notice: Subject to any disclaimer, the term of this patent is extended or adjusted under 35 U.S.C. 154(b) by 193 days.

(21) Appl. No.: 18/402,577

(22) Filed: Jan. 2, 2024

(65) Prior Publication Data

US 2024/0248502 A1 Jul. 25, 2024

(30) Foreign Application Priority Data

Jan. 20, 2023 (KR) ........................ 10-2023-0008950
Mar. 28, 2023 (KR) ........................ 10-2023-0040183

(51) Int. Cl.

*G05F 1/575* (2006.01)
*G05F 1/565* (2006.01)
*G05F 3/26* (2006.01)

(52) U.S. Cl.

CPC .............. *G05F 1/575* (2013.01); *G05F 1/565* (2013.01); *G05F 3/262* (2013.01)

(58) Field of Classification Search

CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/465; G05F 1/468; G05F 1/562; G05F 1/565; G05F 1/567; G05F 1/569; G05F 1/571; G05F 1/573;

(Continued)

(56) References Cited

U.S. PATENT DOCUMENTS 8,080,983 B2 12/2011 Lourens et al.
8,866,453 B2 * 10/2014 Lyle, Jr. ................ H02M 3/156 323/266

(Continued)

*Primary Examiner* — Crystal L Hammond
*Assistant Examiner* — Nusrat Quddus
(74) *Attorney, Agent, or Firm* — Harness, Dickey & Pierce, P.L.C.

(57) ABSTRACT

A system-on-chip includes a low-dropout (LDO) regulator configured to regulate a voltage of input power and to supply operation power to a core through an output mode, the core configured to receive the operation power to perform an operation, and a power supply circuit configured to supply the input power to the LDO regulator. The power supply circuit may receive first power and second power having different voltage characteristics, and may supply third power, which is power having a higher voltage of the first power and the second power, and the second power to the LDO regulator as the input power.

20 Claims, 15 Drawing Sheets

(58) Field of Classification Search

CPC ... G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H05B 39/048; B23K 11/24; H04B 2215/069

See application file for complete search history.

(56) References Cited

U.S. PATENT DOCUMENTS

| | | | | |
|---|---|---|---|---|
| 9,081,404 | B2 * | 7/2015 | Jackum | G05F 1/56 |
| 9,256,237 | B2 | 2/2016 | Kim et al. | |
| 9,454,169 | B2 | 9/2016 | Li | |
| 9,582,017 | B2 | 2/2017 | Petenyi | |
| 9,584,016 | B2 | 2/2017 | Motoki | |
| 9,933,799 | B2 | 4/2018 | Yang et al. | |
| 10,303,192 | B2 | 5/2019 | Pons | |
| 10,326,402 | B2 | 6/2019 | Shimizu | |
| 10,998,858 | B2 | 5/2021 | Zhang | |
| 11,251,611 | B2 | 2/2022 | Chan et al. | |
| 12,169,417 | B2 * | 12/2024 | Nam | G05F 1/563 |
| 2015/0130292 | A1 * | 5/2015 | Yeon | G05F 1/62 307/104 |
| 2015/0263615 | A1 * | 9/2015 | Moon | H02M 3/158 323/266 |
| 2017/0269625 | A1 * | 9/2017 | Pisasale | G05F 3/26 |
| 2020/0278713 | A1 * | 9/2020 | Hashemi | G11C 11/4074 |
| 2021/0216092 | A1 * | 7/2021 | Chang | G05F 1/562 |
| 2022/0397325 | A1 * | 12/2022 | Kuppusamy | F24F 6/04 |
| 2023/0009027 | A1 * | 1/2023 | Chen | H03K 19/017509 |

* cited by examiner

LDO REGULATOR FOR DYNAMIC VOLTAGE SCALING AND SYSTEM-ON-CHIP INCLUDING THE SAME

CROSS-REFERENCE TO RELATED APPLICATION(S)

This application claims benefit of priority to Korean Patent Application No. 10-2023-0008950, filed on Jan. 20, 2023, and 10-2023-0040183, filed on Mar. 28, 2023, in the Korean Intellectual Property Office, the disclosures of which are incorporated herein by reference in their entirety.

BACKGROUND

The present inventive concepts relate to a low-dropout (LDO) regulator and a system-on-chip including the same.

A supply voltage is provided to electronic components to provide power for operations of the electronic components. For example, a system-on-chip such as a mobile application processor (AP) have increased the number of powers to be supplied to the AP due to complexity of the AP. As a result, the number of routing lines connected from a power management integrated circuit (PMIC) to the AP and the number of off-chip elements such as an off-chip load capacitor and an inductor are also increasing.

The development focus of products is on merging power domains of AP cores. However, this may make it difficult to achieve per-core retention of a plurality of cores included in an AP for dynamic voltage scaling (DVS).

SUMMARY

Example embodiments provide a low-dropout (LDO) regulator, securing an operation even in a dynamic voltage scaling (DVS) environment supplying power over a wide range of voltage fluctuation, and a system-on-chip including the same.

Example embodiments of inventive concepts provide a system-on-chip including a low-dropout (LDO) regulator configured to regulate a voltage of input power and to supply operation power to a core through an output mode, the core configured to receive the operation power to perform an operation, and a power supply circuit configured to supply the input power to the LDO regulator, wherein the power supply circuit is configured to receive a first power and a second power having different voltage characteristics and is further configured to supply a third power having a higher voltage of the first power and the second power, and the second power to the LDO regulator as the input power.

Example embodiments of inventive concepts provide a method of operating a system-on-chip comprising a low-dropout (LDO) regulator, the method including receiving first power and second power having different voltage characteristics, comparing the first power and the second power with each other to determine power having a higher voltage as third power, and supplying the third power and the second power to the LDO regulator through different power lines as input power.

Example embodiments of inventive concepts provide a low-dropout (LDO) regulator including an error amplifier configured to receive a feedback voltage and a reference voltage and to amplify and output a difference between the feedback voltage and the reference voltage based on bias power, a pass transistor having a gate node configured to receive an output of the error amplifier as a driving signal, a source node configured to receive input power, and a drain node connected to an output node and configured to adjust a voltage of the input power to provide an output voltage to the output node, and a power supply circuit configured to supply the input power of the pass transistor and the bias power of the error amplifier, wherein the power supply circuit is configured to receive first power and second power having different voltage differences, supply power having a higher voltage of the first power and the second power as the bias power, and supply the second power as the input power of the pass transistor.

BRIEF DESCRIPTION OF DRAWINGS

Some example embodiments of inventive concepts will be more clearly understood from the following detailed description, taken in conjunction with the accompanying drawings.

DETAILED DESCRIPTION

Hereinafter, various example embodiments will be described with reference to the accompanying drawings.

It will be understood that elements and/or properties thereof may be recited herein as being "the same" or "equal" as other elements or properties, and it will be further understood that elements and/or properties thereof recited herein as being "the same" as, or "equal" to other elements may be "the same" as, or "equal" to, other elements and/or properties thereof. Elements and/or properties thereof that are "the same" or "equal" as to other elements and/or properties thereof will be understood to include elements and/or properties thereof that are identical to, the same as, or equal to the other elements and/or properties thereof within manufacturing tolerances and/or material tolerances. Elements and/or properties thereof that are "the same" or "equal" as to other elements and/or properties may be structurally the same or substantially the same, functionally the same or substantially the same, and/or compositionally the same or substantially the same.

Figure 1:
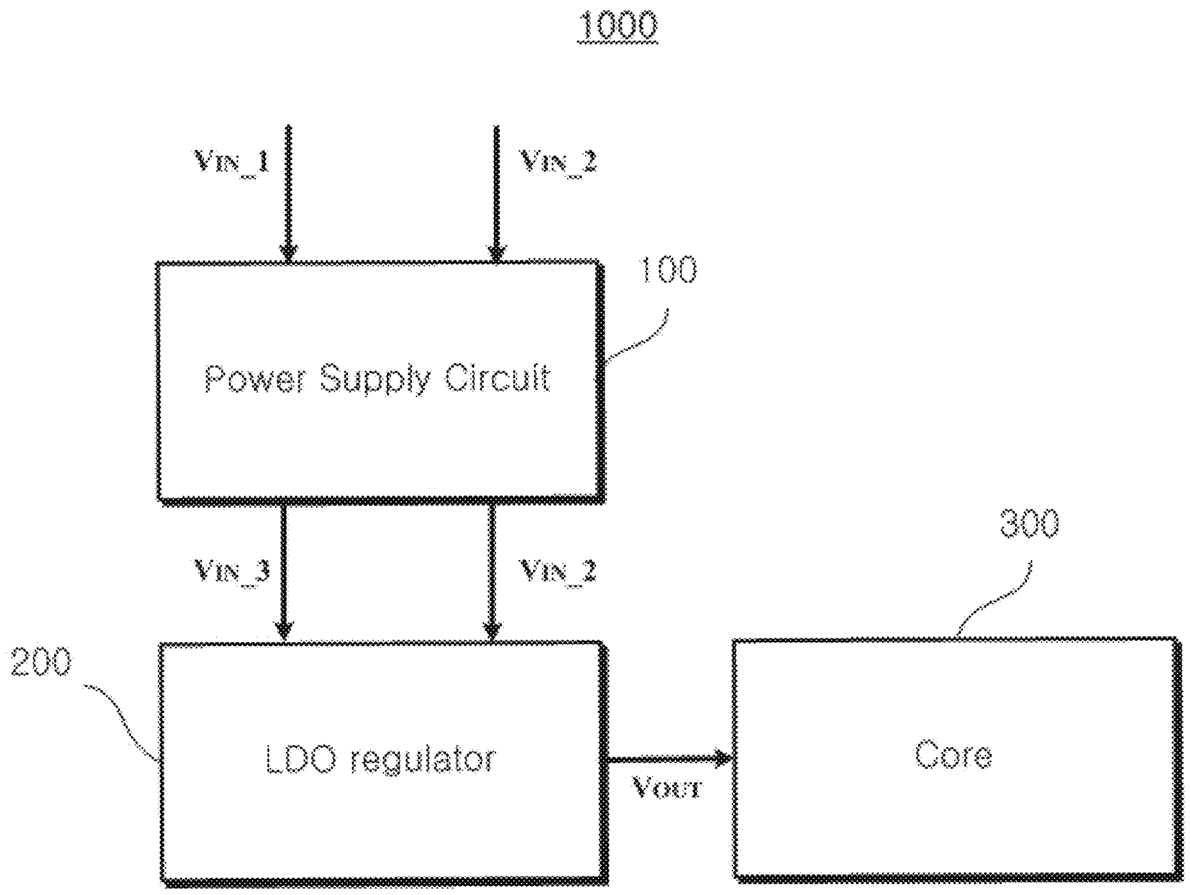
FIG. 1 is a block diagram illustrating a system-on-chip according to an example embodiment.

FIG. 1 is a block diagram illustrating a system-on-chip 1000 according to an example embodiment. Referring to FIG. 1, the system-on-chip 1000 may include a power supply circuit 100, a low-dropout (LDO) regulator 200, and a core 300.

The system-on-chip 1000 may be an application processor (AP) used in a mobile device such as a smartphone or a tablet PC, or a central processing unit (CPU) and a graphics processing unit (GPU) of a general-purpose computer. The core 300 may be a logic circuit performing tasks such as calculation and computation of a processor, and may be a core circuit of a CPU, a GPU, or an AP, but example embodiments are not limited thereto.

In an example embodiment, the LDO regulator 200 may receive a plurality of powers having different voltage characteristics from the power supply circuit 100 and a may use the received powers as input powers. The LDO regulator 200 may regulate a voltage of one of the plurality of powers received, and may output the regulated voltage to an output node. An output power voltage $V_{OUT}$ may provide current, corresponding to current consumed to perform an operation such as calculation or computation in the core 300, to the core 300.

In an example embodiment, the power supply circuit 100 may receive first power VIN_1 and second power VIN_2, the plurality of powers having different voltage characteristics, from a power management integrated circuit (PMIC), and may determine power having a higher voltage, of the received powers, as third power VIN_3 and provide the third power VIN_3 to the LDO regulator 200 together with the second power VIN_2.

The first power VIN_1, received from the PMIC by the power supply circuit 100, may be power having a fixed magnitude of voltage and the second power VIN_2, received from the PMIC by the power supply circuit 100, may be power having a dynamic voltage magnitude. For example, the first power VIN_1 may be power having a fixed magnitude of voltage used for operation of a static random access memory (SRAM). The second power VIN2 may be a dynamic voltage scaling (DVS) power having a time-varying voltage magnitude for per-core retention of a core. Accordingly, in some example embodiments, even when fixed power having a high voltage (for example, fixed power of 1.2 V according to conventional arts) is not provided due to introduction of an ultra-fine process into the core, an operation of the core in a DVS environment, according to some example embodiments, may be secured.

In some example embodiments, the power supply circuit 100 and the LDO regulator 200 may be used with an analog LDO regulator. Alternatively, in some example embodiments, the power supply circuit 100 and the LDO regulator 200 may be used with an analog LDO regulator of a hybrid LDO regulator including an analog LDO regulator and a digital LDO regulator.

Figure 2:
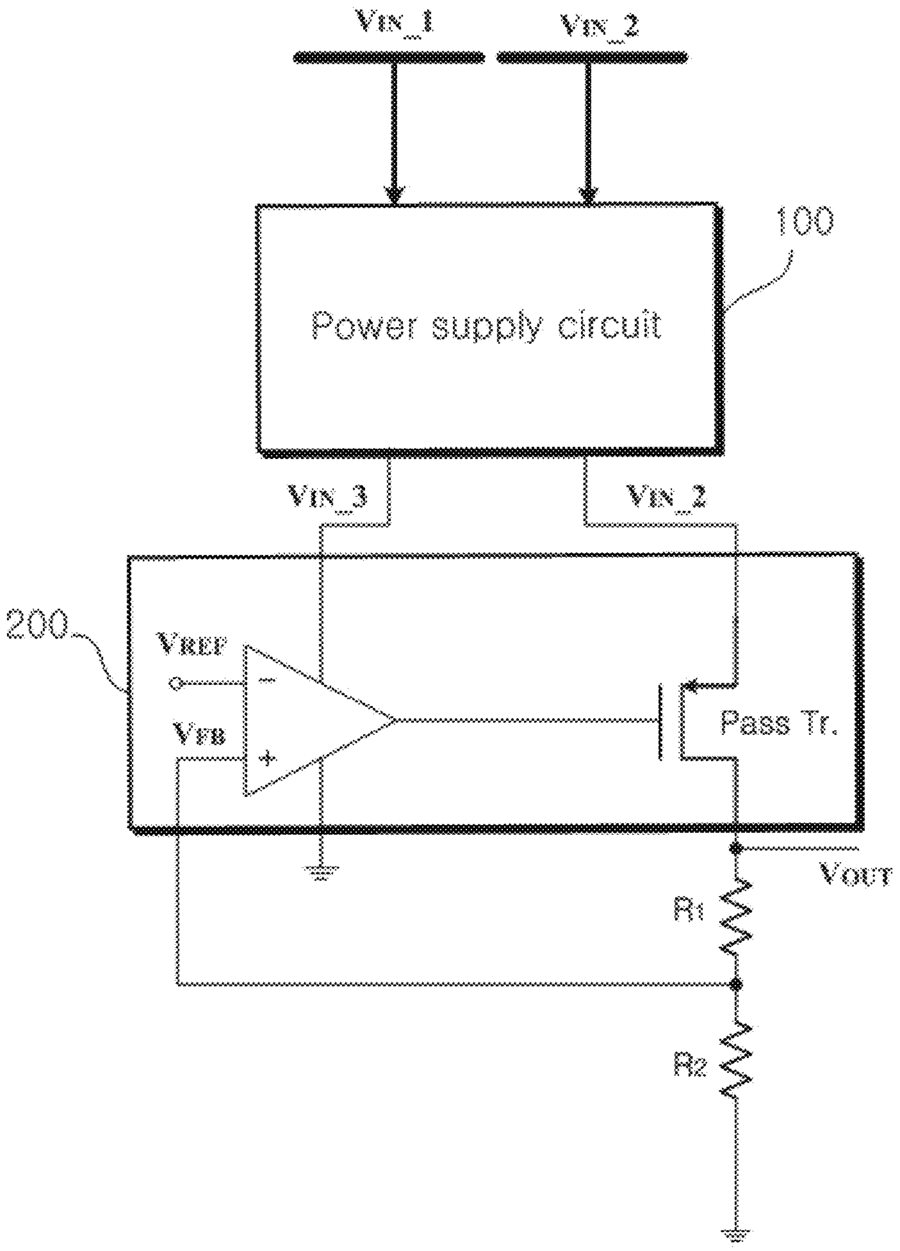
FIG. 2 is a diagram illustrating an LDO regulator according to an example embodiment.
Figure 3:
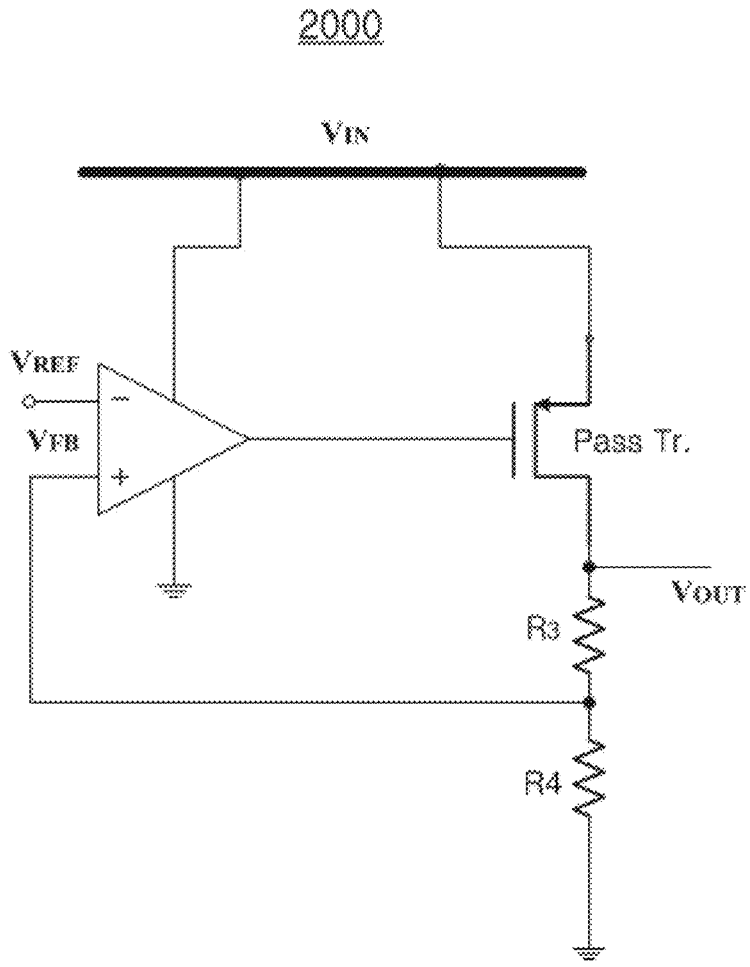
FIG. 3 is a diagram illustrating issues of an LDO regulator according to conventional arts in a DVS environment.

FIG. 2 is a diagram illustrating an LDO regulator 200 according to an example embodiment, and FIG. 3 is a diagram illustrating an LDO regulator according to conventional arts.

In an example embodiment, the LDO regulator 200 may receive a plurality of powers (e.g., the second power VIN_2 and the third power VIN_3) from the power supply circuit 100 as input powers.

The second power VIN_2 may be DVS power received from the PMIC by the power supply circuit 100 and having a voltage magnitude varying with time for per-core retention of a core. The LDO regulator 200 may regulate the second power VIN_2 as an output voltage to supply operating power of the core 300 to an output node.

The output voltage $V_{OUT}$ of the pass transistor may provide a voltage at which per-core retention of the core 300 may be achieved by changing a ratio of resistances of a plurality of resistance elements R1 and R2 connected in series to the output node. Some resistors R1 may be variable resistors.

The third power VIN_3 may be power determined to have a higher voltage of the fixed power having the fixed magnitude of voltage (e.g., the first power VIN_1) and the DVS power having a voltage magnitude varying with time (e.g., the second power VIN_2). The error amplifier, receiving a feedback voltage $V_{FB}$ and a reference voltage $V_{REF}$, and amplifying, and outputting a difference between the feedback voltage $V_{FB}$ and the reference voltage $V_{REF}$ based on bias power, may use the third power VIN_3 as the bias power. A voltage of the first power VIN_1 may be within a range of variation of the variable voltage of the second power VIN_2.

Accordingly, in some example embodiments, the system-on-chip 1000 and the LDO regulator 200, included in the system-on-chip 1000, may use a power having a higher voltage, among a plurality of powers, as bias power of the error amplifier to reliably turn off the pass transistor. As a result, in some example embodiments, unrequired current may be prevented from being supplied to the core 300 through the pass transistor even in a no load state or a low load state of the core 300.

In some example embodiments, the LDO regulator 200 may secure an operation of a core even when fixed power of 1.2 V is not provided due to an ultra-fine process, compared with the LDO regulator 2000, according to conventional arts (e.g., FIG. 3).

In some example embodiments, to improve and/or increase power efficiency of an LDO regulator, it is advantageous and/or beneficial to reduce and/or decrease a difference between an output voltage and an input voltage. However, in some example embodiments, in the case of an LDO regulator using single power, an operation of an LDO regulator including an error amplifier cannot be secured when an input voltage, lower than or equal to a predetermined (e.g., desired) voltage, is used.

In conventional arts, when the LDO regulator 2000 uses the fixed power of 1.2 V supplied to a core as input power, an operation and per-core retention of the LDO regulator are secured, but power efficiency is low. In addition, in conventional arts, when the fixed power of 1.2 V supplied to the core is not provided due to an ultra-fine process in the future, the LDO regulator 2000 cannot secure a stable operation in a DVS environment with supplied powers. For example, in conventional arts, when DVS power of a core supplied from a PMIC is used as input power of the LDO regulator of FIG. 3, an operation of an error amplifier cannot be secured within a predetermined (e.g., desired) voltage range of the DVS power. In addition, in conventional arts, when power having a fixed magnitude of voltage is used as input power of the LDO regulator 2000, per-core retention of the core cannot be achieved.

In conventional arts, even an LDO regulator having dual powers using additional power as bias power of the error amplifier cannot secure an operation of the LDO regulator when the fixed power of 1.2 V supplied to the core is not provided due to an ultra-fine process in the future. For example, in conventional arts power having a fixed voltage used for operation of an SRAM may be used as bias power of an error amplifier, and a DVS power having a variable voltage may be used as input power of a pass transistor. For example, when a voltage of the DVS power is greater than a voltage of the bias power of the pass transistor, the pass transistor cannot be completely turned off. Accordingly, unrequired current may be provided a core to prevent or alternatively reduce, per-core retention from being achieved.

In some example embodiments, the system-on-chip 1000 may supply power having a higher voltage, among a plurality of powers, to the power supply circuit 100 as bias power of the LDO regulator 200. For example, the bias power of the LDO regulator 200 always has a voltage greater than or equal to the input voltage of the pass transistor, so that the pass transistor may be completely turned off, but example embodiments are not limited thereto, and, in some example embodiments, the bias power of the LDO regulator 200 may have a voltage greater than or equal to the input voltage of the pass transistor, so that the pass transistor may be turned off. For example, a voltage at which an error amplifier is operable may be applied as bias power to secure a stable operation of the error amplifier.

Figure 4:
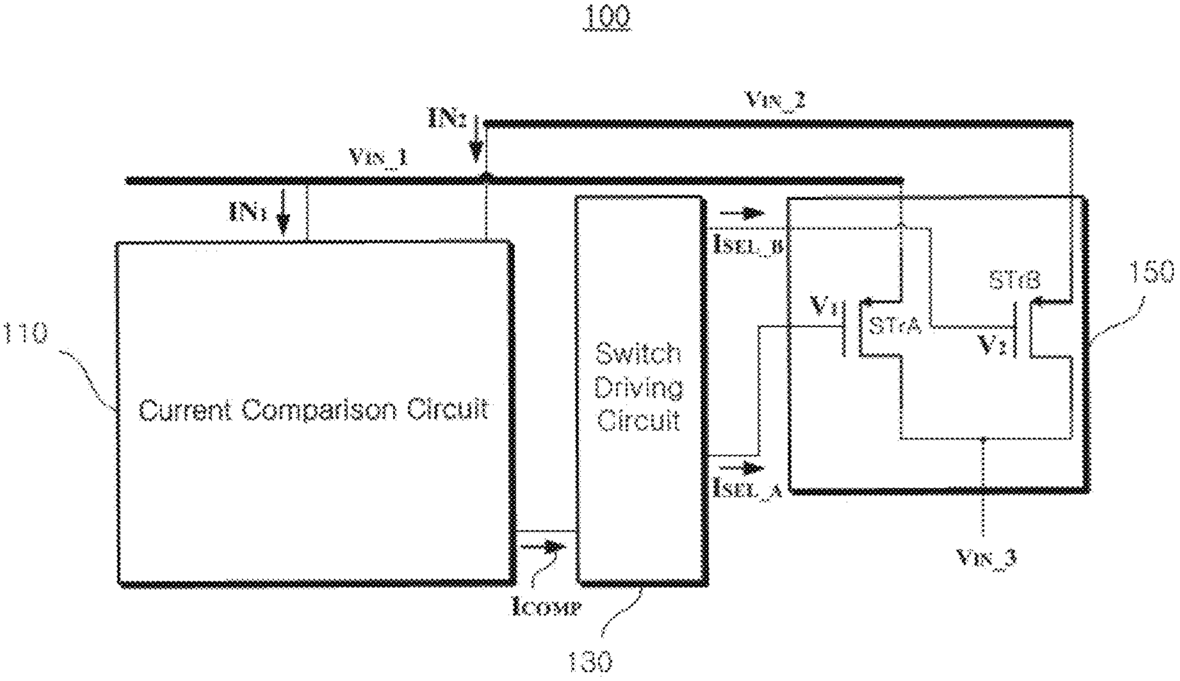
FIG. 4 is a block diagram of a power supply circuit according to an example embodiment.

FIG. 4 is a block diagram illustrating a power supply circuit 100 according to an example embodiment.

In some example embodiments, the power supply circuit 100 may include a current comparison circuit 110, a switch driving circuit 130, and a power select circuit 150.

The current comparison circuit 110 may compare voltage magnitudes of the first power VIN_1 and the second power VIN_2 based on comparison of current magnitudes. The current comparison circuit 110 may be connected to the first power VIN_1 and the second power VIN_2 to output a comparison signal $I_{COMP}$ obtained by comparing the magnitudes of currents IN1 and IN2 provided from the first power VIN_1 and VIN_2. Power lines, provided with the currents IN1 and IN2 provided from the first power VIN_1 and the second power VIN_2, are each illustrated as being a single power line in FIG. 4. However, in some example embodiments, each of the power lines may be provided in plural depending on a structure of a plurality of current comparison circuits 110, as illustrated in other drawings. In some example embodiments, the comparison signal $I_{COMP}$ may be distinguished as an activation level (ON) or a deactivation level (OFF) depending on a direction of current. For example, in some example embodiments, when the current IN2 provided from the second power VIN_2 is greater than the current IN1 provided from the first power VIN_1, it may be set to be the activation level (ON).

The switch driving circuit 130 may control a plurality of switches STrA and STrB included in the power select circuit 150 based on the comparison signal $I_{COMP}$ output from the current comparison circuit 110. The plurality of switches STrA and STrB may include a P-channel metal-oxide-semiconductor (PMOS) transistor.

The switch driving circuit 130 may include an element, such as an inverter, to generate a signal controlling the PMOS switches STrA and STrB included in the power select circuit 150 based on the comparison signal $I_{COMP}$ output from the current comparison circuit 110. The switch driving circuit 130 will be described below through various example embodiments.

In some example embodiments, when the current IN2 provided from the second power VIN_2 is greater than the current IN1 provided from the first power VIN_1, the switch driving circuit 130 may transmit a low signal from the PMOS switch STrB, connected to the second power VIN_2 of the power select circuit 150, to a gate node to turn of the switch STrB. For example, the transmitting the low signal may be decreasing or reducing a gate voltage $V_2$ to be lower than a source voltage of the switch STrB. In this case, in some example embodiments, the switch driving circuit 130 may transmit a high signal to the PMOS switch STrA connected to the first power VIN_1 of the power select circuit 150 to the gate node to turn off the switch STrB.

The plurality of switches STrA and STrB of the power select circuit 150, in which a source node is connected to each of the first power VIN_1 and the second power VIN_2, may be complementarily turned on or turned off. Thus, in some example embodiments, each of the plurality of switches STrA and STrB may output the connected first power VIN_1 or second power VIN_2 as third power VIN_3.

In some example embodiments, each of the plurality of switches STrA and STrB of the power select circuit 150 is implemented as an n-channel MOS (NMOS) transistor. For example, in this case, when a magnitude of the fixed voltage of the first power VIN_1 is within a range of a variable voltage of the second power VIN_2, each switch may not be completely turned off. Accordingly, in some example embodiments, the plurality of switches STrA and STrB of the power select circuit 150 include PMOS transistors, so that the power select circuit 150 may stably operate in a DVS environment of ultra-fine process.

Figure 5:
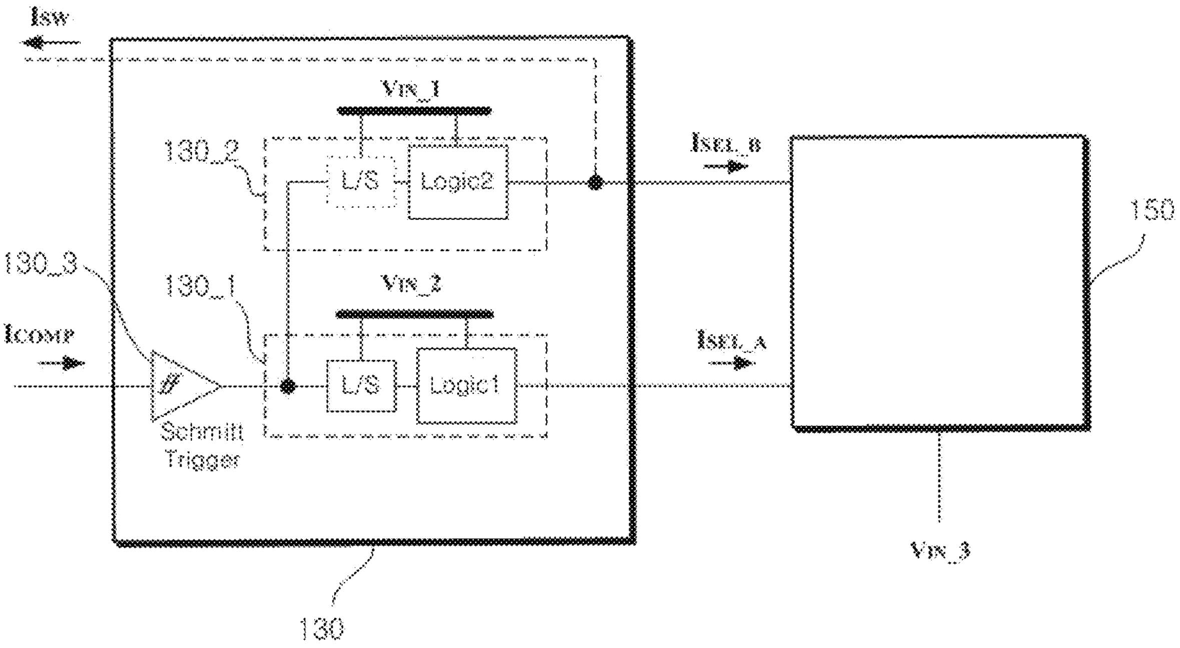
FIG. 5 is a diagram illustrating a switch driving circuit according to an example embodiment.

FIG. 5 is a diagram illustrating a switch driving circuit according to an example embodiment.

The switch driving circuit 130 may transmit control signals ISEL_A and ISEL_B, complementarily turning on or turning off a plurality of PMOS switches of the power select circuit 150, to the power select circuit 150.

The switch driving circuit 130 may include a first switch driving circuit 130_1, providing a driving signal ISEL_A of a first switch, connected to a first power VIN_1, among a plurality of switches, and a second switch driving circuit 130_2 providing a driving signal ISEL_B of a second switch, connected to a second power VIN_2, among the plurality of switches.

In some example embodiment, the first switch driving circuit 130_1 and the second switch driving circuit 130_2 may generate a signal controlling PMOS switches, to which each switch corresponds, based on a comparison signal $I_{COMP}$ of currents IN1 and IN2 provided from the first power VIN_1 and the second power VIN_2. The first switch driving circuit 130_1 and the second switch driving circuit 130_2 may include a logic element such as an inverter based on gate-source voltage characteristics of the PMOS switch and the comparison signal $I_{COMP}$ to generate a control signal.

In some example embodiments, the first switch driving circuit 130_1 and the second switch driving circuit 130_2 may receive an operating voltage from power, different from power connected to a corresponding switch. For example, the first switch driving circuit 130_1, transmitting a control signal ISEL_A to a first switch STrA connected to the first power VIN_1, may receive an operating voltage from second power. Similarly, in some example embodiments, the second switch driving circuit 130_2, transmitting the control signal ISEL_B to the second switch STrB connected to the second power VIN_2, may receive an operating voltage from the first power VIN_1.

Among the PMOS switches of the power select circuit 150, a turned-off switch is in a state of being connected to lower power than a turned-on switch. Accordingly, in some example embodiments, turning off the PMOS switch of the power select circuit 150 should be based on a voltage of power, other than power transmitted by itself.

The first switch driving circuit 130_1 and the second switch driving circuit 130_2 may selectively include a level shifter according to changes in voltage level of a received input signal and output level (high or low) of logic circuits Logic1 and Logic2. For example, when the voltage level of the logic circuits Logic1 and Logic2 is lower than an operating voltage level of the logic circuits Logic1 and Logic2 and an activation level (High) output of the logic circuits Logic1 and Logic2 is required, a level shifter may be provided to prevent short-current of the logic circuit element. Accordingly, in some example embodiments, the first switch driving circuit 130_1 and the second switch driving circuit 130_2 may selectively include a level shifter according to the voltage level of the input signal, the operating voltage level of the logic circuit, and the configurations of the logic circuits Logic1 and Logic2. The level shifter may also be selectively included in the example embodiments of FIGS. 6 to 13.

In some example embodiments, the switch driving circuit 130 may selectively include a Schmitt trigger circuit to provide hysteresis to input signals of the first switch driving circuit 130_1 and the second switch driving circuit 130_2.

Figure 6:
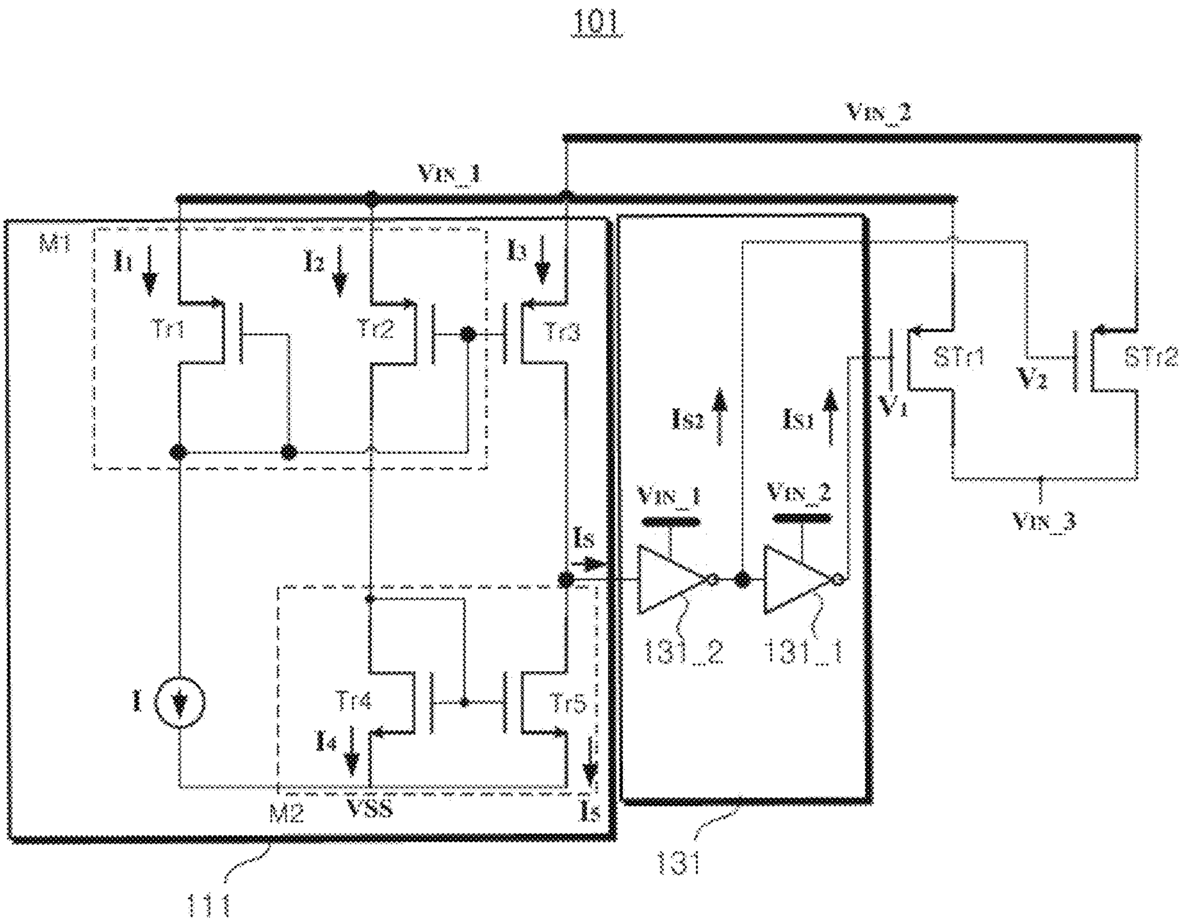
FIG. 6 is a block diagram illustrating a power supply circuit based on current comparison according to an example embodiment.

FIG. 6 is a block diagram illustrating a power supply circuit based on current comparison according to an example embodiment.

FIG. 6 is a block diagram of a power supply circuit 101 comparing voltage magnitudes of first power VIN_1 and second power VIN_2 based on current comparison according to an example embodiment.

In some example embodiments, the power supply circuit 101 may include a current comparison circuit 111, PMOS switches STr1 and STr2, and a switch driving circuit 131. The current comparison circuit 111 may compare voltage magnitudes of the first power VIN_1 and the second power VIN_2 based on the current comparison. The PMOS switches STr1 and STr2 may be connected to the first power VIN_1 and the second power VIN_2, respectively. The switch driving circuit 131 may transmit a driving signal to the PMOS switches STr1 and STr2.

The current comparison circuit 111 may include transistors Tr1, Tr2, and Tr4 and transistors Tr3 and Tr5. The transistors Tr1, Tr2, and Tr4 may receive input currents I1, I2, and I4 from the first power VIN_1. The transistors Tr3 and Tr5 may receive input currents I3 and I5 from the second power VIN_2. The current comparison circuit 111 may include a constant current source I connected to the transistor Tr1. Some transistors Tr1 and Tr2 may constitute a current mirror circuit M1, and other transistors Tr4 and Tr5 may constitute another current mirror circuit M2.

Due to the constant current source I, current I corresponding to the constant current source I may flow as output current $I_1$ of the transistor Tr1 connected to first power VIN_1. In addition, in some example embodiments, due to a configuration of a current mirror circuit M1, the same current I may flow as output current $I_2$ of the transistor Tr2. Due to the output current $I_2$ of the transistor Tr2, the same current I may flow as output current $I_4$ of the transistor Tr4 and the same current I may also flow as output current $I_5$ of the transistor Tr5 constituting the current mirror circuit M2 with the transistor Tr4.

For example, when a voltage of second power VIN_2 is higher than a voltage of the first power VIN_1, a gate source voltage of the transistor Tr3 is greater than a gate source voltage of the transistor Tr2, so that current greater than current I of the transistor Tr5 may flow as output current $I_3$ of the transistor Tr3. Accordingly, in some example embodiments, output current $I_S$ of the current comparison circuit 111 may transmit current corresponding to a high level, as a result of comparison, to the switch driving circuit 131.

A second switch driving circuit 131_2 of the switch driving circuit 131 may invert the output current $I_S$ corresponding to the high level and may transmit the inverted output current to a second switch Str2 to turn on the second switch Str2 and to output the second power VIN_2 as third power VIN_3. A first switch driving circuit 131_1 may transmit a signal $I_{S1}$, obtained by reinverting a low signal of the second switch driving circuit 131_2, to the first switch Str1 to turn off the first switch Str1. As described above, in some example embodiments, an operating voltage of the first switch driving circuit 131_1 is provided from the second power VIN_2 having a higher voltage than the first power VIN_1, so that the first switch Str1, a PMOS switch, may be reliably turned off.

For example, when the voltage of the second power VIN_2 is lower than the voltage of the first power VIN_1, the source gate voltage of the transistor Tr3 is lower than the source gate voltage of the transistor Tr2, so that current lower than the current I of the transistor Tr5 may flow as output current I3 of the lower transistor Tr3. Accordingly, in some example embodiments, the output current $I_S$ of the current comparison circuit 111 may transmit current corresponding to a low level, as a result of comparison, to the switch driving circuit 131. In contrast to what has been described above, the switch driving circuit 131 may transmit a low signal $I_{S1}$ to the first switch Str1 to turn on the first switch Str1 and may transmit a high signal $I_{S2}$ to the second switch Str2 to turn off the second switch Str2.

Figure 7:
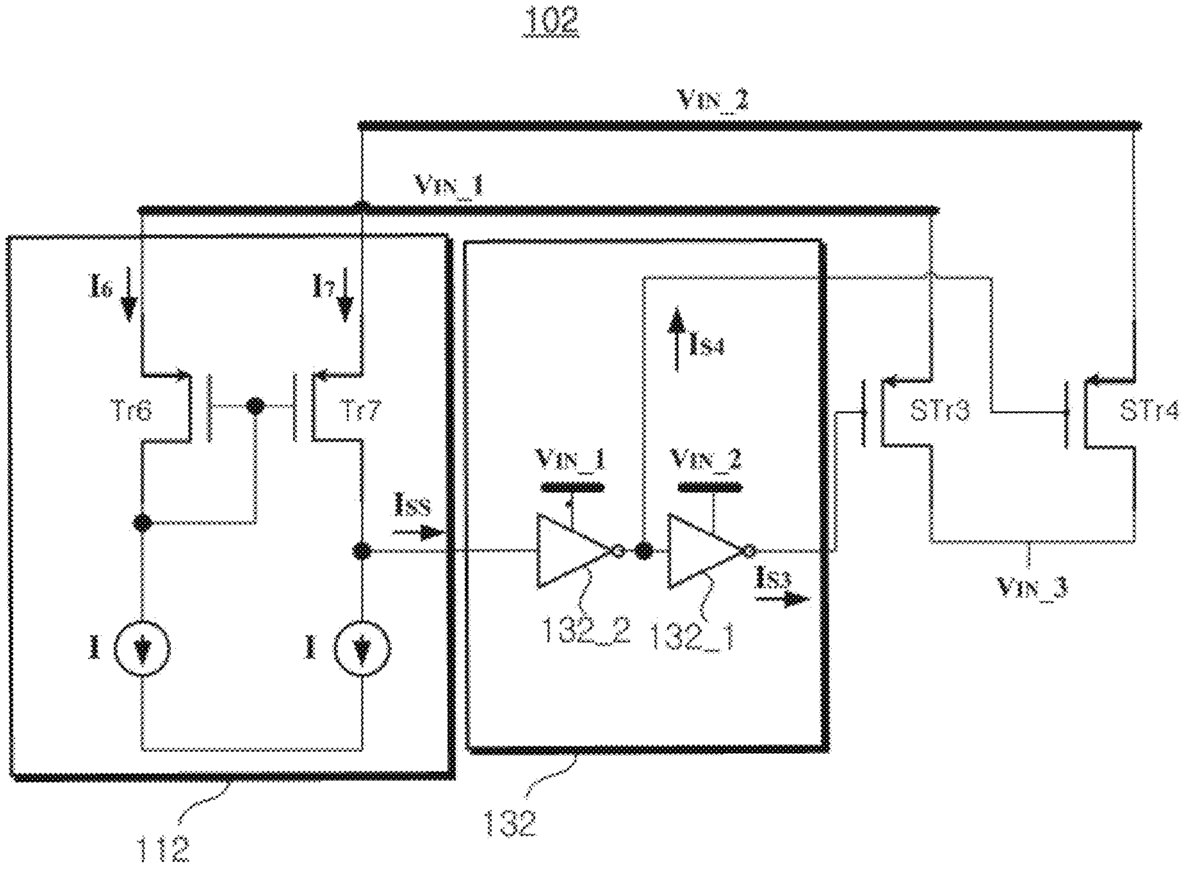
FIG. 7 is a block diagram illustrating a power supply circuit based on current comparison according to an example embodiment.

FIG. 7 is a block diagram of a power supply circuit 102, comparing voltage magnitudes of a first power VIN_1 and a second power VIN_2 based on current comparison, according to an example embodiment.

In some example embodiments, the power supply circuit 102 may include a current comparison circuit 112 based on comparison of current magnitudes to compare voltage magnitudes of the first power VIN_1 and the second power VIN_2, PMOS switches STr3 and STr4, respectively connected to the first power VIN_1 and the second power VIN_2, and a switch driving circuit 132 transmitting driving signals to the PMOS switches STr3 and STr4.

The current comparison circuit 112 may include a transistor Tr6, receiving input current I6 from the first power VIN_1, and a transistor Tr7 receiving input current I7 from the second power VIN_2. The current comparison circuit 112 may include a plurality of constant current sources I, respectively connected to transistors Tr6 and Tr7. A gate node of the transistor Tr6 may be connected to an output of a drain node on a constant current source side.

Current I corresponding to the constant current source I flows as output current $I_6$ of the transistor Tr6 connected to first power VIN_1 due to the constant current source I, and a gate source voltage of the transistor Tr7 is greater than a gate source voltage of the transistor Tr6 when a voltage of the second power VIN_2 is higher than a voltage of the first power VIN_1. For example, current greater than the current $I_6$ of the transistor Tr6 may flow as output current $I_7$ of the transistor Tr7. Accordingly, in some example embodiments, output current $I_{SS}$ of the current comparison circuit 112 may transmit current corresponding to a high level, as a result of comparison, to the switch driving circuit 132.

A second switch driving circuit 132_2 of the switch driving circuit 133 may invert the output current $I_{SS}$ corresponding to a high level and may transmit a low signal Is4 to the second switch Str4 to turn on the second Str4 and to output the second power VIN_2 as third power VIN_3. The first switch driving circuit 132_1 may transmit a signal $I_{S3}$, obtained by reinverting the low signal of the second switch driving circuit 132_2, to the first switch Str3 to turn off the first switch Str3. An operating voltage of the first switch driving circuit 132_1 may be received from the second power VIN_2 having a higher voltage than the first power VIN_1.

For example, when the voltage of the second power VIN_2 is lower than the voltage of the first power VIN_1, a gate source voltage of the transistor Tr7 is lower than a gate source voltage of the transistor Tr6, so that current having a lower magnitude than the current $I_6$ of the transistor Tr6 may flow as output current $I_7$ of the transistor Tr7. Accordingly, in some example embodiments, the output current $I_{SS}$ of the current comparison circuit 112 may transmit current corresponding to a low level, as a result of comparison, to the switch driving circuit 132.

The switch driving circuit 133 may transmit a low signal $I_{S3}$ to the first switch Str3 to turn on the first switch Str3, and may transmit a high signal $I_{S4}$ to the second switch Str4 to turn off the second switch Str4.

Figure 8:
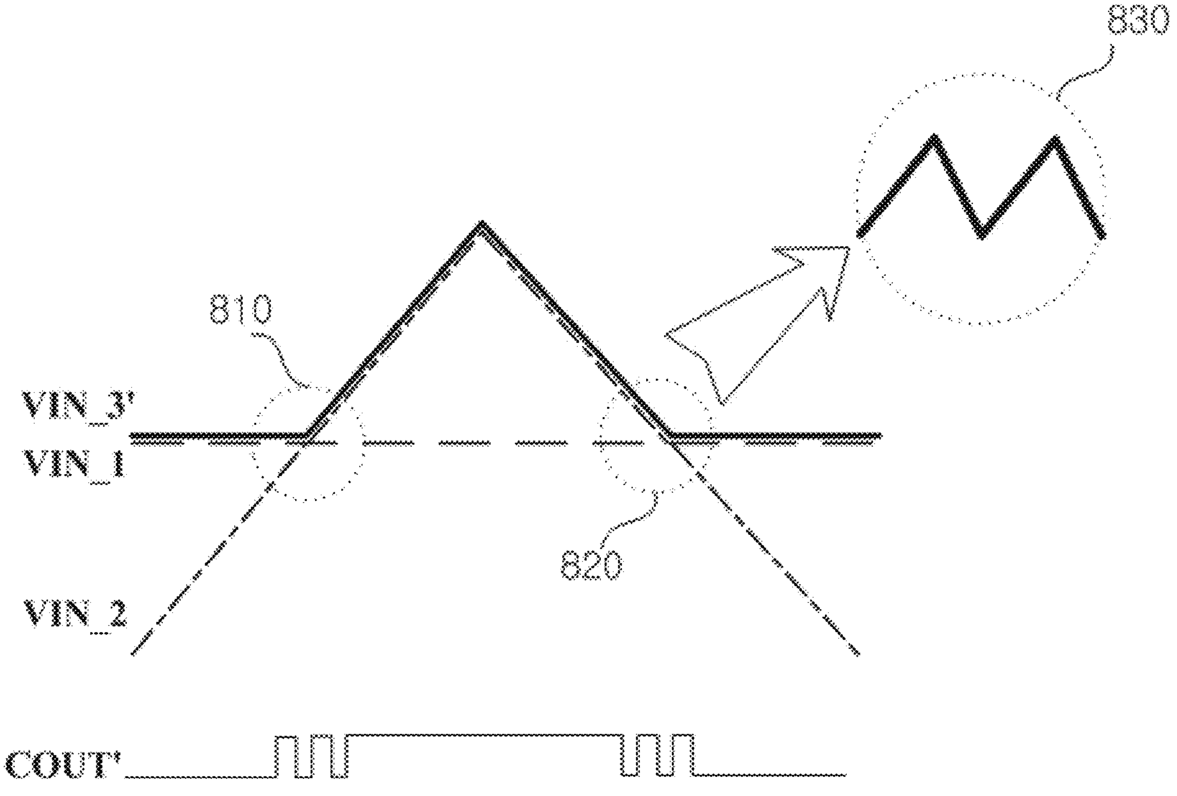
FIGS. 8 and 9 are diagrams illustrating a power supply circuit having hysteresis.
Figure 9:
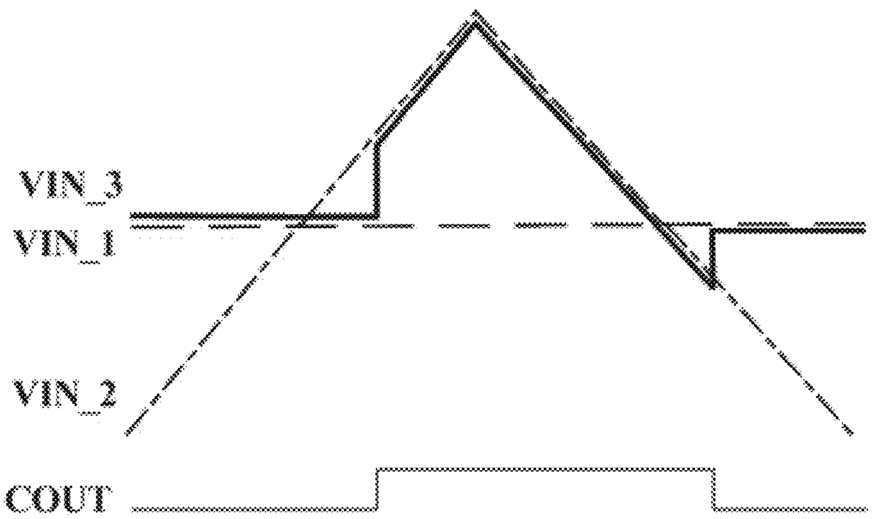

FIGS. 8 and 9 are diagrams illustrating a power supply circuit having hysteresis.

Referring to FIG. 8, when a power supply circuit has no hysteresis, an output COUT' of a switch driving circuit may be inconstant and vary within predetermined ranges 810 and 820, in which voltage magnitudes of first power VIN_1 and second power VIN_2 are similar to each other, due to noise contained in power, or the like. Accordingly, in some example embodiments, variation 830 of a voltage of third power VIN_3 output by a power select circuit within the ranges 810 and 820 may occur between a voltage of the first power VIN_1 and a voltage of the second power VIN_2. For example, when the voltage of the first power VIN_1 which is a fixed magnitude of voltage is within a variation range of a voltage of the second power VIN_2 which is a variable voltage, the third power VIN_3 may be affected by noise.

Accordingly, in some example embodiments, the current comparison circuit may have hysteresis illustrated in FIG. 9 and may be configured such that a voltage of third power stably has a voltage of the first power VIN_1 or the second power VIN_2.

Figure 10:
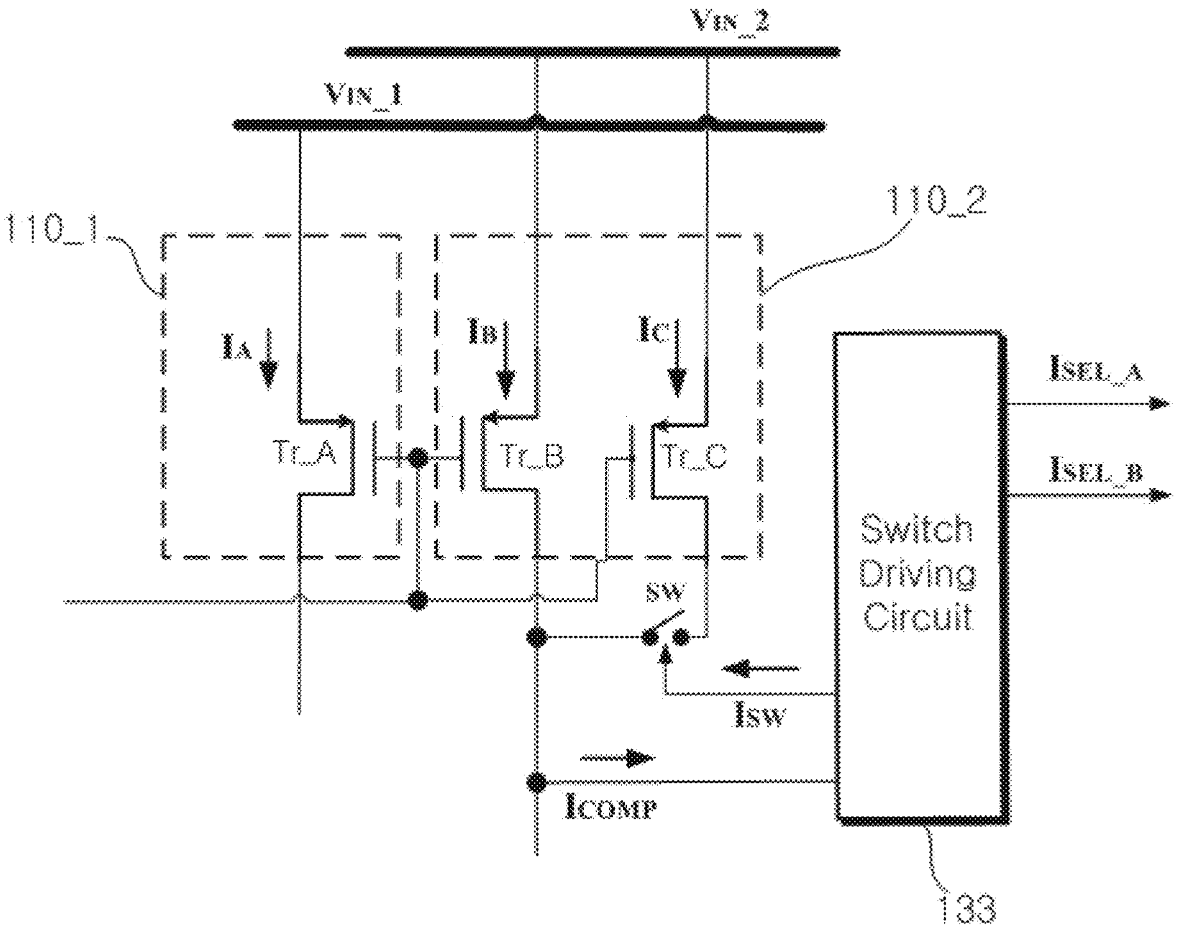
FIG. 10 is a block diagram illustrating a current comparison circuit having hysteresis according to an example embodiment.

FIG. 10 is a block diagram illustrating a current comparison circuit having hysteresis according to an example embodiment.

The circuits 110_1 and 110_2 having hysteresis in FIG. 10 may replace the transistors Tr2 and Tr3 in the example embodiment of the current comparison circuit 111 of FIG. 6 or the transistors Tr6 and Tr6 in the example embodiment of the current comparison circuit 112 of FIG. 7.

In some example embodiments, the current comparison circuit having hysteresis may include a first metal-oxide-semiconductor field-effect transistor (MOSFET) circuit 110_1, in which one of a source node and a drain node receives current supplied from the first power VIN_1, and a second MOSFET circuit 110_2 in which one of the source node and the drain node receives current supplied from the second power VIN_2.

A gate node of the first MOSFET circuit 110_1 and a gate node of the second MOSFET circuit 110_2 of the current comparison circuit may be connected to each other, and a resistance magnitude ratio of the first MOSFET circuit 110_1 and the second MOSFET circuit 110_2 may vary based on a comparison signal $I_{COMP}$ of the current comparison circuit.

A transistor Tr_A included in the first MOSFET circuit 110_1 and transistors Tr_B and Tr_C included in the second MOSFET circuit 110_2 may each be a transistor set in which a plurality of transistors are connected in parallel. The transistor Tr_A and the transistor Tr_B may have different resistance magnitude ratios. The resistance may be voltage-dependent resistance of a transistor. For example, gate-source voltages of the transistors may be different from each other, or the number of transistors connected in parallel and included in the transistor set may vary.

A switch SW may be closed by a switch control signal $I_{SW}$ generated by a switch driving circuit 133 and the transistor Tr_C of the second MOSFET circuit 110_2 may be connected in parallel to the transistor Tr_B after outputting the comparison signal $I_{COMP}$ indicating that a voltage of the second power VIN_2 is higher than a voltage of the first voltage VIN_1. The switch control signal $I_{SW}$ may be a signal to close a switch SW when a control signal $I_{SEL\_B}$, driving a switch connected to the second power VIN_2 in the power select circuit, is low. As in the above-described example embodiments, the control signals ISEL_A and ISEL_B driving the switches of the power select circuit may be generated based on the comparison signal $I_{COMP}$ of the current comparison circuit.

Figure 11:
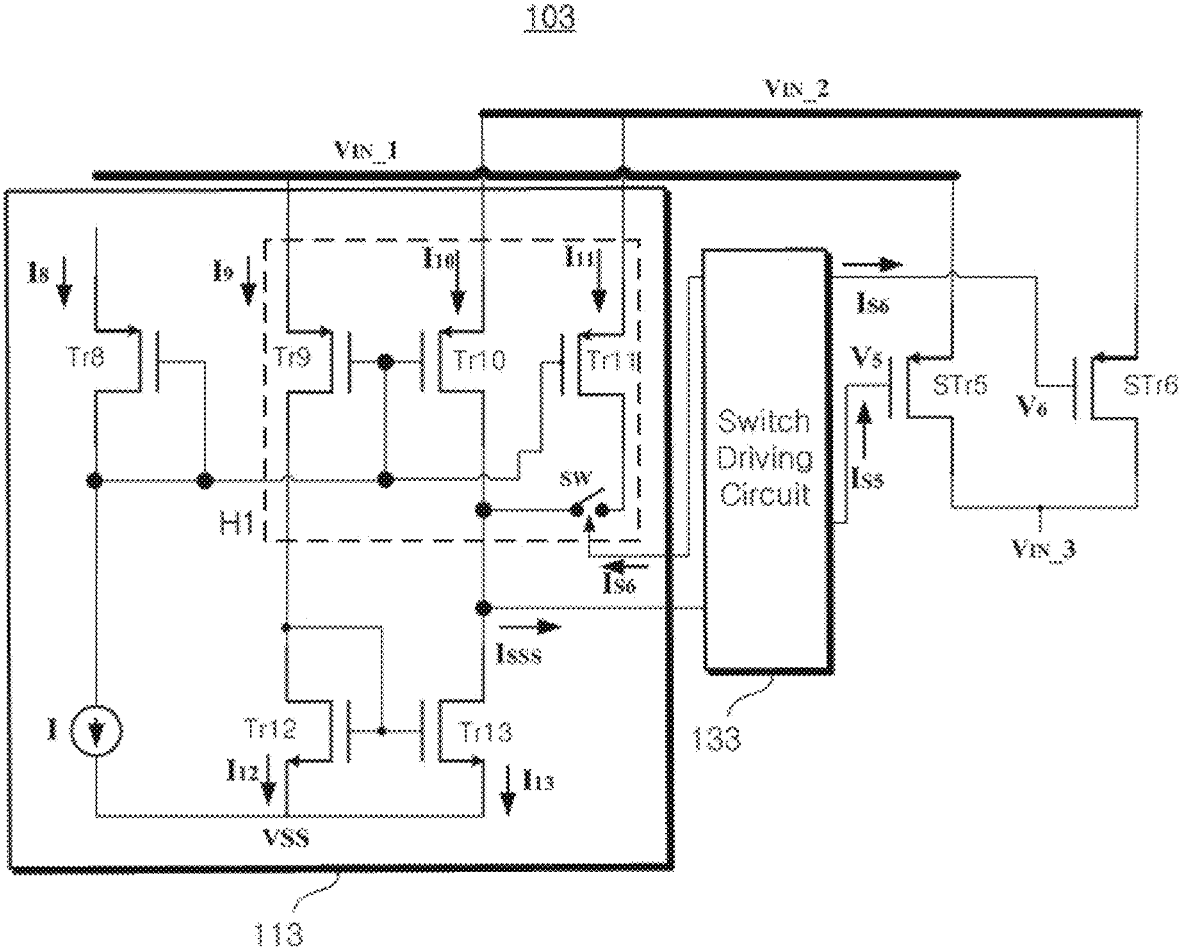
FIGS. 11 and 12 are block diagrams, each illustrating a power supply circuit having hysteresis according to an example embodiment.

FIG. 11 a block diagram illustrating a power supply circuit 103 including a current comparison circuit having hysteresis according to an example embodiment.

FIG. 11 illustrates a power supply circuit 103 including a current comparison circuit having hysteresis according to an example embodiment. The power supply circuit 103 of FIG. 11 is a power supply circuit in which the transistors Tr2 and Tr3 of the current comparison circuit 111 of the power supply circuit 101 in the example embodiment of FIG. 6 are replaced with those in the example embodiment of FIG. 10.

A magnitude of power-dependent resistance of a transistor Tr_9 connected to first power VIN_1 of a hysteresis unit H1 of a current comparison circuit 113 may be different from a magnitude of power-dependent resistance of a transistor Tr_10 connected to a second power VIN_2. For example, when a voltage of the second power VIN_2 is greater than a voltage of the first power VIN_1 by a predetermined or desired difference or more, a comparison signal $I_{SSS}$ indicating the voltage of the second power VIN_2 is greater than the voltage of the first power VIN_1 may be generated within the predetermined or desired difference depending on the magnitude ratio of the power-dependent resistance.

For example, when the voltage of the second power VIN_2 is determined to be greater than the voltage of the first power VIN_1, a switch driving circuit 133 may transmit a control signal $I_{S6}$ to a switch SW for closing the switch SW and a transistor Tr11 may be connected in parallel to a transistor Tr10. Accordingly, in some example embodiments, a ratio of voltage-dependent resistance of the transistors Tr10 and Tr11, connected in parallel to each other, to voltage-dependent resistance of the transistor Tr9 may be changed. Then, for example, when the voltage of the second power VIN_2 is determined to be smaller than the voltage of the first power VIN_1 while the changed ratio of the voltage-dependent resistance of the transistors Tr10 and Tr11 to the voltage-dependent resistance of the transistor Tr9 is maintained, the circuit 133 may transmit the control signal $I_{S6}$ to the switch SW for opening the switch SW.

Figure 12:
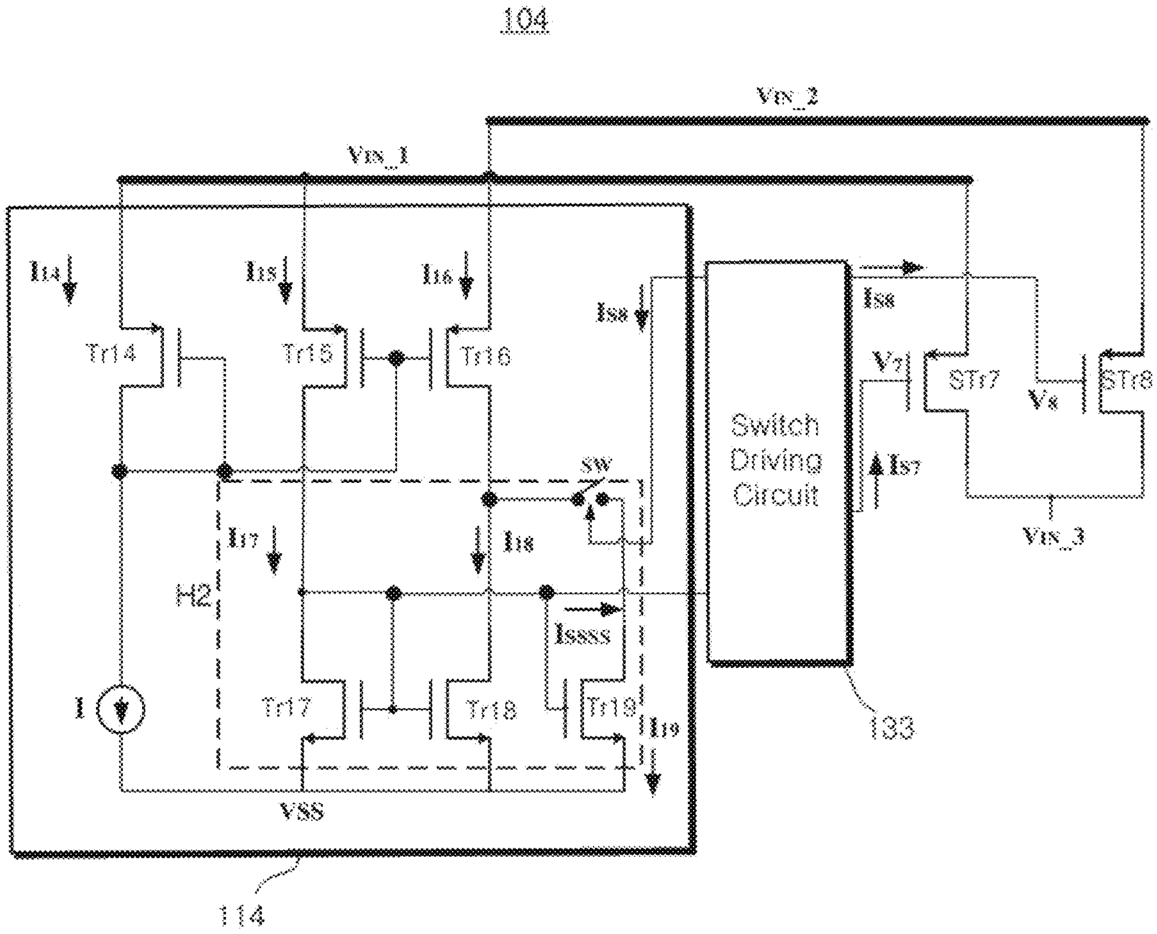

FIG. 12 illustrates a power supply circuit 104 including a current comparison circuit having hysteresis according to an example embodiment. The power supply circuit 104 of FIG. 12 is a power supply circuit in which the transistors Tr4 and Tr5 of the current comparison circuit 111 in the example embodiment of the power supply circuit 101 of FIG. 6 are replaced with those of the example embodiment of FIG. 10.

Similarly to what has been described with reference to FIG. 11, a magnitude of power-dependent resistance of a transistor Tr_17, receiving current from first power VIN_1 of a hysteresis unit H2 of a current comparison circuit 114, is different from a magnitude of power-dependent resistance of a transistor Tr_18 receiving current from second power VIN_2. For example, when a voltage of the second power VIN_2 is determined to be greater than a voltage of the first power VIN_1, a switch driving circuit 133 may transmit a control signal $I_{S8}$ to a switch SW for closing the switch SW and the transistor Tr19 may be connected in parallel to a transistor Tr18. For example, when the voltage of the second power VIN_2 is determined to be smaller than the voltage of the first power VIN_1 while a changed ratio of voltage-dependent resistance of the transistors Tr18 and Tr19 to voltage-dependent resistance of the transistor Tr17 is maintained, a switch driving circuit 133 may transmit the control signal $I_{S8}$ to the switch SW for opening the switch SW.

Figure 13:
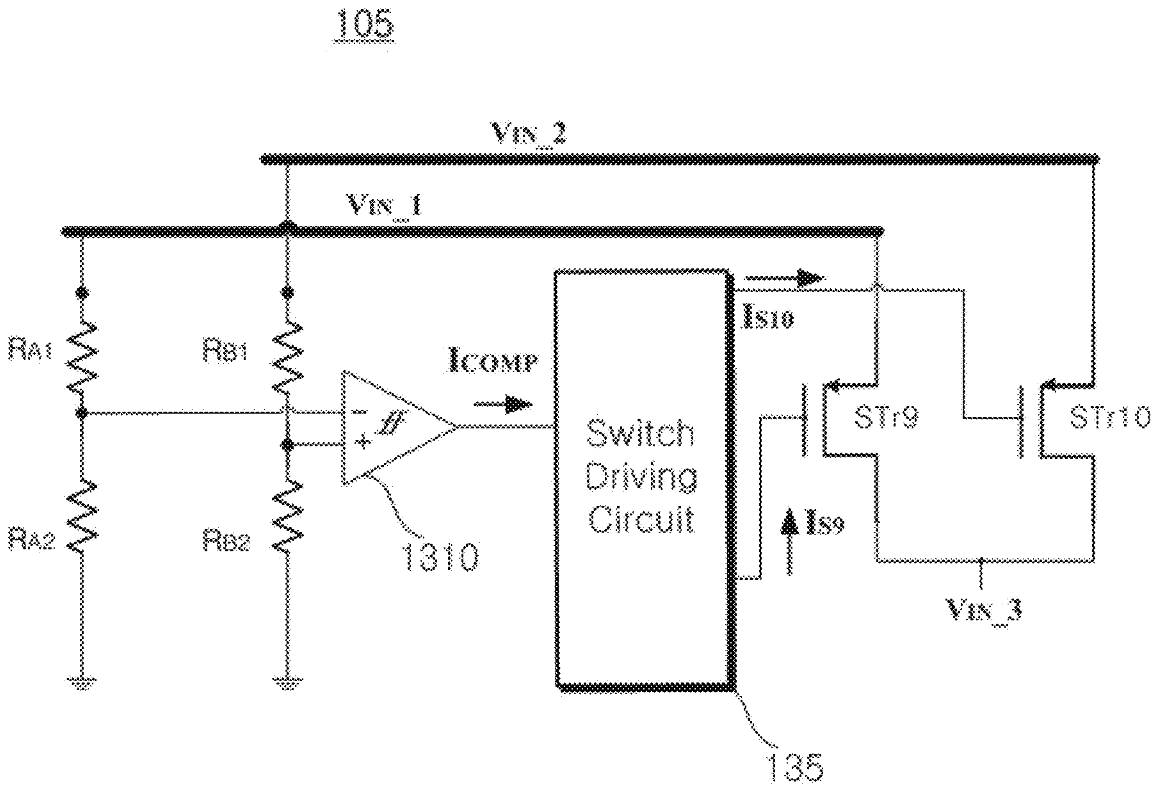
FIG. 13 is a block diagram illustrating a power supply circuit based on voltage comparison according to an example embodiment.

FIG. 13 is a block diagram of a power supply circuit 105 comparing magnitudes of voltages of first power VIN_1 and second power VIN_2 based on voltage comparison according to an example embodiment. A detailed description overlapping the above description will be omitted.

In some example embodiments, the power supply circuit 105 may include a voltage comparison circuit based on voltage magnitude comparison to compare the magnitudes of the voltages of the first power VIN_1 and the second power VIN_2, PMOS switches STr9 and STr10, respectively connected to the first power VIN_1 and VIN_2, and a switch driving circuit 135 transmitting driving signals to the PMOS switches STr9 and STr10.

The voltage comparator circuit may include a plurality of resistor sets RA1 and RA2 connected in series and receiving a voltage from the first power VIN_1, a plurality of resistor sets RB1 and RB2 connected in series and receiving a voltage from the second power VIN_2, and a voltage comparator 1310. The voltage comparator 1310 may include hysteresis therein.

The switch driving circuit 135 of the power select circuit may be the same as the switch driving circuit 130 of FIG. 5 or the switch driving circuit 131 of FIG. 6.

The switch driving circuit 135 may receive a voltage magnitude comparison signal $I_{COMP}$ to changes a voltage level, and may provide a driving signal to the switches STr9 and STr10 through a logic operation such as inversion. The switches STr9 and STr10 may output power, to which they are connected, as third power VIN_3 based on the driving signal.

Figure 14:
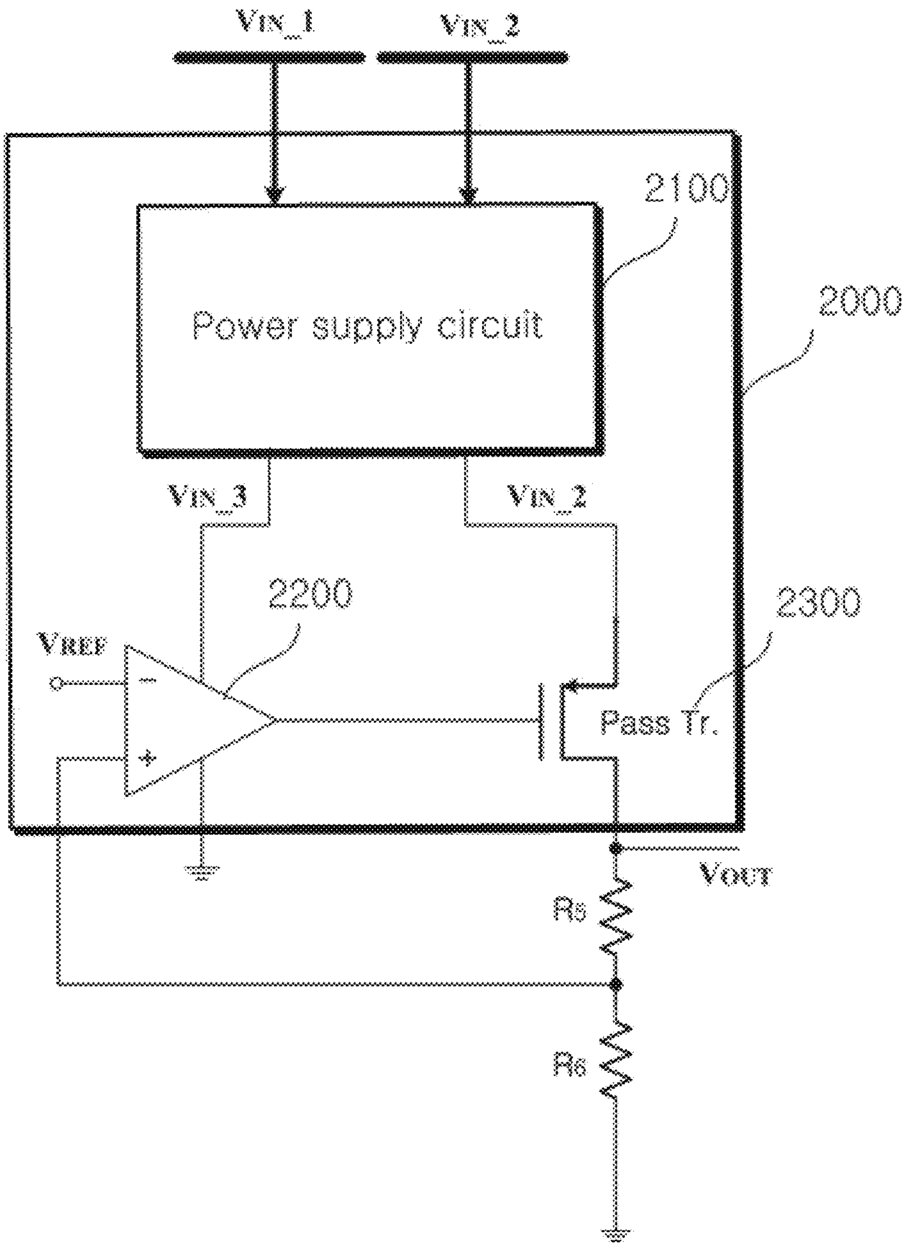
FIG. 14 is a block diagram illustrating an LDO regulator based on voltage comparison according to an example embodiment.

FIG. 14 is a block diagram illustrating an LDO regulator 2000 based on voltage comparison according to an example embodiment. A detailed description overlapping the above description will be omitted.

Referring to FIG. 14, the LDO regulator 2000 may include a power supply circuit 2100, an error amplifier 2200, and a pass transistor 2300.

The error amplifier 2200 may receive a feedback voltage and a reference voltage, and may amplify a difference between the feedback voltage and the reference voltage based on a bias power and transmit the amplified difference to a gate node of the pass transistor 2300. The LDO regulator 2000 may be provided inside a system-on-chip such as a mobile application processor (AP).

In an example embodiment, the error amplifier 2200 may receive power having a higher voltage of first power VIN_1 and second power VIN_2 having different voltage characteristics from a power select circuit 2100 as a bias voltage of the error amplifier 2200.

The pass transistor 2300 may include a gate node receiving an output of the error amplifier 2200 as a driving signal, a source node receiving input power, and a drain node connected to the output node, and may adjust a voltage of the input power to provide an output voltage $V_{OUT}$ to the output node. Input power of the pass transistor 2300 may receive the second power VIN_2.

In an example embodiment, the power select circuit 2100 may be connected to the first power VIN_1 having a fixed voltage magnitude and the second power VIN_2 having a variable voltage magnitude. The second power VIN_2 may be DVS power. The power select circuit 2100 may supply power having a higher voltage of the first power VIN_1 and the second power VIN_2 as third power VIN_3, bias power of the error amplifier 2200, based on a comparison signal obtained by comparing magnitudes of currents provided from the first power VIN_1 and the second power VIN_2.

Figure 15:
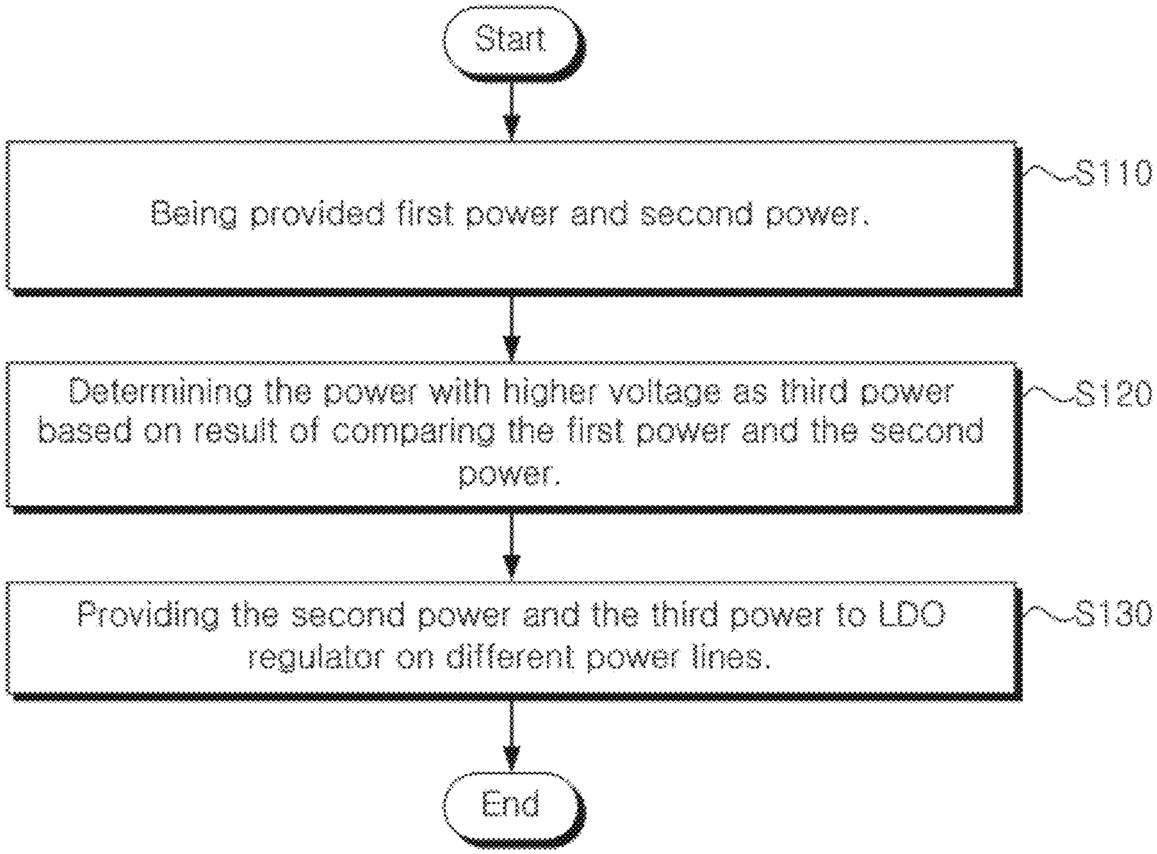
FIG. 15 is a flowchart illustrating an operation of a system-on-chip according to an example embodiment.

FIG. 15 is a flowchart illustrating an operation of a system-on-chip according to an example embodiment. A detailed description overlapping the above description will be omitted. The system-on-chip may include a low-dropout (LDO) regulator.

In operation S110, the system-on-chip may receive first power VIN_1 and a second power VIN_2 having different voltage characteristics. For example, the system-on-chip may receive first power VIN_1 having a fixed voltage magnitude and second power VIN_2 having a variable voltage magnitude.

In operation S120, the system-on-chip may compare the first power VIN_1 and the second power VIN_2 to determine power having a higher voltage as third power VIN_3. In operation S130, the system-on-chip may supply the third power VIN_3 and the second power VIN_2 to the LDO regulator. The third power VIN_3 provided to the LDO regulator may be provided as bias power of an error amplifier of the LDO regulator.

The system-on-chip may compare magnitudes of currents provided from the first power VIN_1 and the second power VIN_2 to determine power having a higher voltage of the first power VIN_1 and the second power VIN_2 as the third power VIN_3. In this case, the current magnitude comparison may be performed by a current comparison circuit having hysteresis.

The system-on-chip may be connected to one of the first power VIN_1 and the second power VIN_2, and may transmit a control signal based on the current magnitude comparison to a gate node of each of a plurality of switch elements including a PMOS transistor. For example, only one of the plurality of switch elements may be complementarily turned on to output power, to which the only one power is connected, as the third power VIN_3.

As set forth above, according to some example embodiments, an LDO regulator and a system-on-chip including the LDO regulator may secure an operation even in a DVS environment, in which power within a wide voltage variation range is supplied, and may maintain an output voltage provided to a core even in a no load sate of the core.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While some example embodiments have been shown and described above, it will be apparent to those skilled in the art that modifications and variations could be made without departing from the scope of the present inventive concepts as defined by the appended claims.

What is claimed is:

1. A system-on-chip comprising:

a low-dropout (LDO) regulator configured to regulate a voltage of input power and to supply operation power to a core through an output mode;

the core configured to receive the operation power to perform an operation; and a power supply circuit comprising a comparison circuit based on current or voltage and configured to supply the input power to the LDO regulator, wherein the power supply circuit is configured to receive a first power and a second power having different voltage characteristics and is further configured to supply a third power having a higher voltage of the first power and the second power based on a comparison signal obtained by comparing magnitudes of currents or voltages provided from the first power and the second power by the comparison circuit, and the second power to the LDO regulator as the input power.

2. The system-on-chip of claim 1, wherein the third power is supplied as bias power of an error amplifier and the LDO regulator, and the second power is supplied to either one of a source node or a drain node of a pass transistor of the LDO regulator.

3. The system-on-chip of claim 2, wherein the operation power of the core is output as a variable voltage through resistance control of a plurality of resistance elements connected in series to an output node.

4. The system-on-chip of claim 1, wherein the first power has a fixed magnitude of voltage, and the second power has a variable magnitude of voltage.

5. The system-on-chip of claim 4, wherein the voltage of the first power is within a variation range of the variable magnitude of voltage of the second power.

6. The system-on-chip of claim 1, wherein the power supply circuit comprises:

a current comparison circuit connected to the first power and the second power and configured to output a comparison signal obtained by comparing magnitudes of currents provided from the first power and the second power;

a power select circuit comprising a plurality of switch elements connected to one of the first power and the second power and configured to receive the comparison signal of the current comparison circuit and to output one of the first power and the second power as the third power; and a switch driving circuit configured to provide a driving signal outputting the third power to a gate node of each of the plurality of switch elements of the power select circuit based on the comparison signal of the current comparison circuit.

7. The system-on-chip of claim 6, wherein the power select circuit comprises a plurality of switches comprising a p-channel metal-oxide-semiconductor (PMOS) transistor, and each of the plurality of switches has a source node connected to one of the first power and the second power and is turned on or turned off based on the comparison signal of the current comparison circuit.

8. The system-on-chip of claim 7, wherein the switch driving circuit comprises:

a first switch driving circuit configured to provide a driving signal of a first switch, connected to the first power, among the plurality of switches; and a second switch driving circuit configured to provide a driving signal of a second switch, connected to the second power, among the plurality of switches.

9. The system-on-chip of claim 8, wherein the first switch driving circuit is configured to receive an operation voltage from the second power, and the second switch driving circuit is configured to receive an operation voltage from the first power.

10. The system-on-chip of claim 9, wherein at least one of the first switch driving circuit and the second switch driving circuit are configured to generate a driving signal of a corresponding switch based on an output signal of a level shifter that is configured to receive the comparison signal of the current comparison circuit.

11. The system-on-chip of claim 7, wherein the power select circuit comprises a Schmitt trigger circuit configured to receive the comparison signal of the current comparison circuit, process the received comparison signal as an output signal reflecting hysteresis, and provide the processed comparison signal as an input signal of the switch driving circuit.

12. The system-on-chip of claim 6, wherein the current comparison circuit comprises a first metal-oxide-semiconductor field-effect transistor (MOSFET) circuit, in which either one of a source node or a drain node is configured to receive current provided from the first power, and a second MOSFET circuit in which either one of a source node or a drain node is configured to receive current provided from the second power, a gate node of the first MOSFET circuit and a gate node of the second MOSFET circuit are connected to each other, and a resistance magnitude ratio of the first MOSFET circuit and the second MOSFET circuit varies based on the comparison signal of the current comparison circuit.

13. The system-on-chip of claim 12, wherein a resistance magnitude of the second MOSFET circuit varies based on the comparison signal of the current comparison circuit.

14. The system-on-chip of claim 12, wherein the second MOSFET circuit comprises:

a plurality of MOSFET elements in which either one of a source node or a drain node is configured to receive current provided from the second power; and a switch electrically opened or closed based on a switching signal received from the switch driving circuit, and a portion of the plurality of MOSFET elements of the second MOSFET circuit are connected in parallel to other MOSFET elements in a closed (ON) state of the switch.

15. The system-on-chip of claim 14, wherein the switch is closed (ON) when the voltage of the second power is greater than the voltage of the first power, and the switch is opened (OFF) when the voltage of the second power is smaller than the voltage of the first power.

16. A method of operating a system-on-chip comprising a low-dropout (LDO) regulator, the method comprising:

receiving first power and second power having different voltage characteristics;

comparing the first power and the second power with each other to determine power having a higher voltage as third power based on a comparison signal obtained by comparing magnitudes of currents or voltages provided from the first power and the second power; and supplying the third power and the second power to the LDO regulator through different power lines as input power.

17. The method of claim 16, wherein the comparing the first power and the second power with each other to determine the power having a higher voltage as the third power comprises:

determining, by a current comparison circuit connected to the first power and the second power, power having a higher voltage of the first power and the second power as the third power based on magnitudes of currents provided from the first power and the second power.

18. The method of claim 17, wherein the supplying the input power to the LDO regulator comprises:

providing a driving signal outputting the third power to a gate node of each of a plurality of switch elements connected to one of the first power and the second power and including a p-channel metal-oxide-semiconductor (PMOS) transistor.

19. A low-dropout (LDO) regulator comprising:

an error amplifier configured to receive a feedback voltage and a reference voltage and to amplify and output a difference between the feedback voltage and the reference voltage based on bias power;

a pass transistor having a gate node configured to receive an output of the error amplifier as a driving signal, a source node configured to receive input power, and a drain node connected to an output node and configured to adjust a voltage of the input power to provide an output voltage to the output node; and a power supply circuit configured to supply the input power of the pass transistor and the bias power of the error amplifier, wherein the power supply circuit is configured to receive first power and second power having different voltage differences, supply power having a higher voltage of the first power and the second power as the bias power, and supply the second power as the input power of the pass transistor, wherein the power supply circuit are connected to the first power and the second power and is configured to supply power having a higher voltage of the first power and the second power as the bias power based on a comparison signal obtained by comparing magnitudes of currents or voltages provided from the first power and the second power.

20. The LDO regulator of claim 19, wherein the first power has a fixed magnitude of voltage, and the second power has a variable magnitude of voltage.

* * * * *